Nov. 26, 1968  E. ZILLMER  3,413,062
CIRCULAR MAGAZINE FOR PHOTOGRAPHIC PROJECTORS
Filed March 14, 1966  5 Sheets-Sheet 1
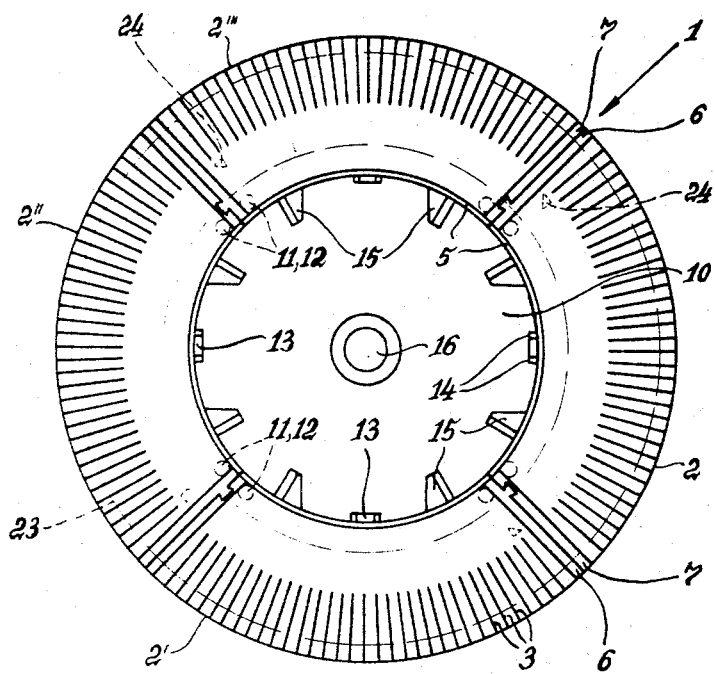
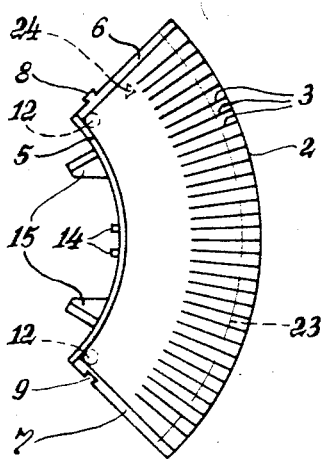
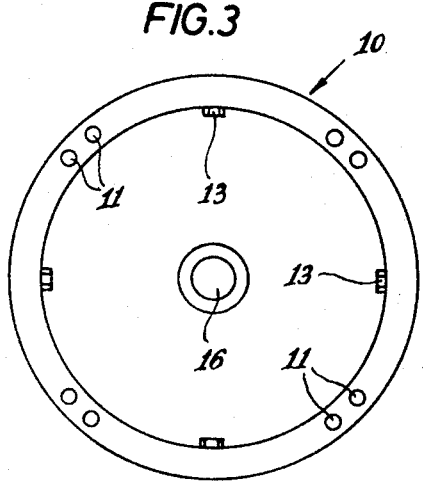

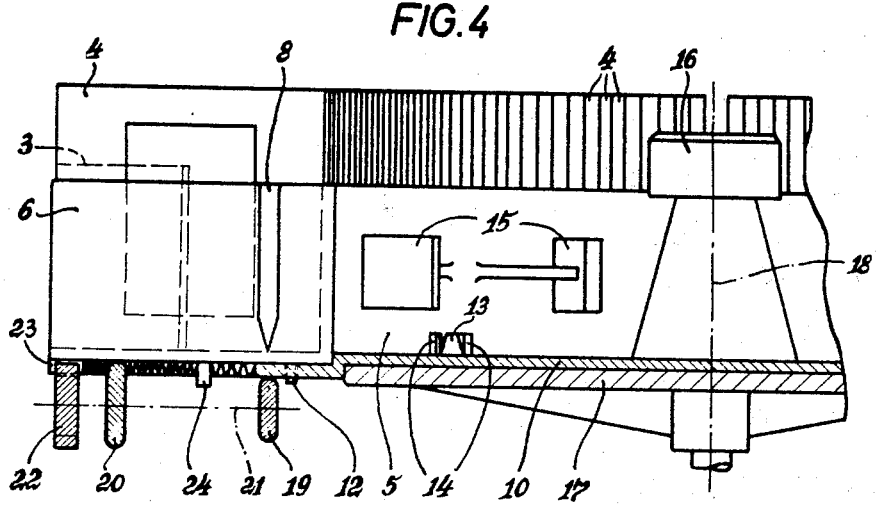
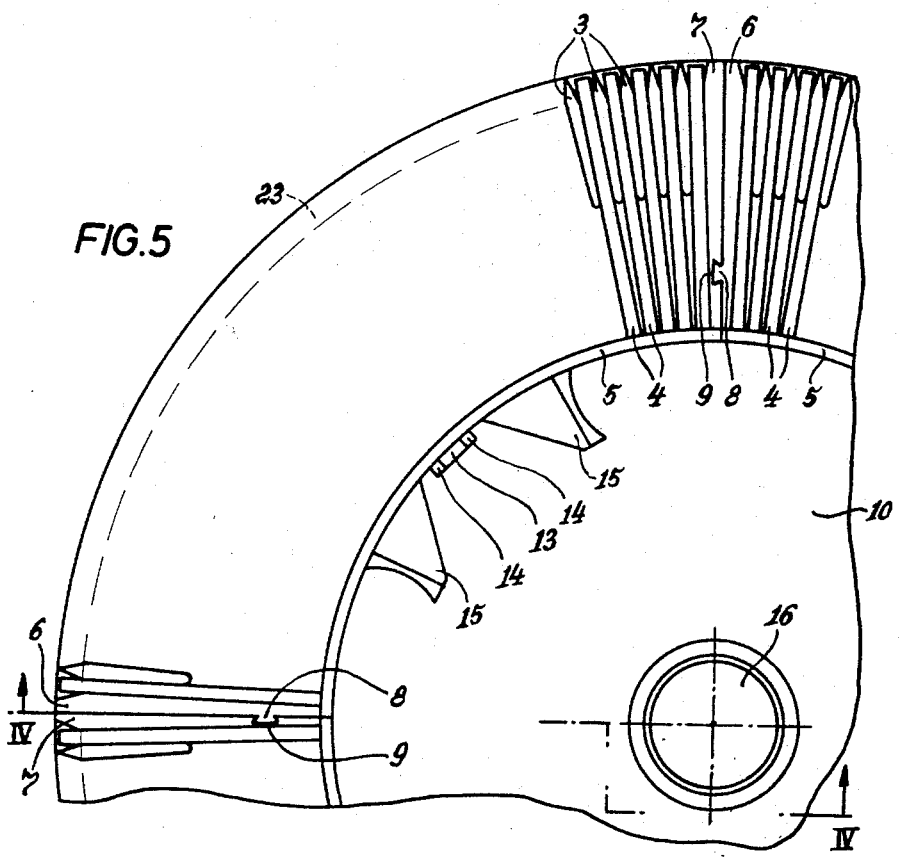

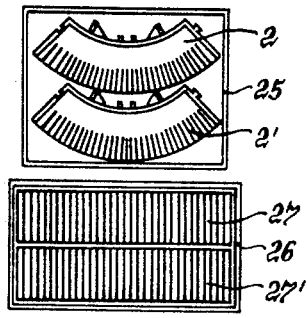
FIG.6
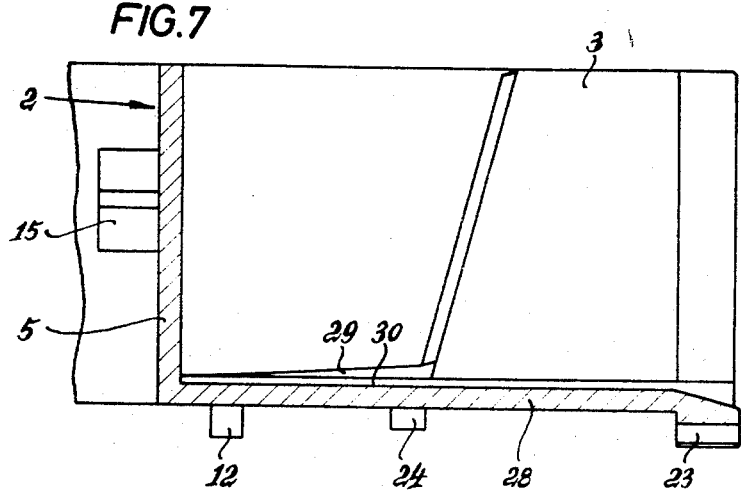
FIG.7
FIG.9  FIG.8
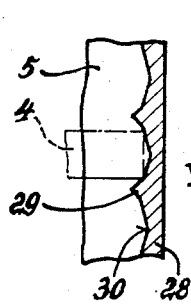
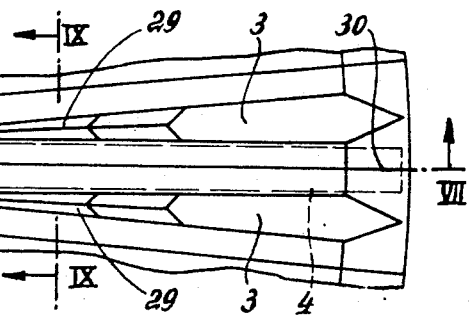

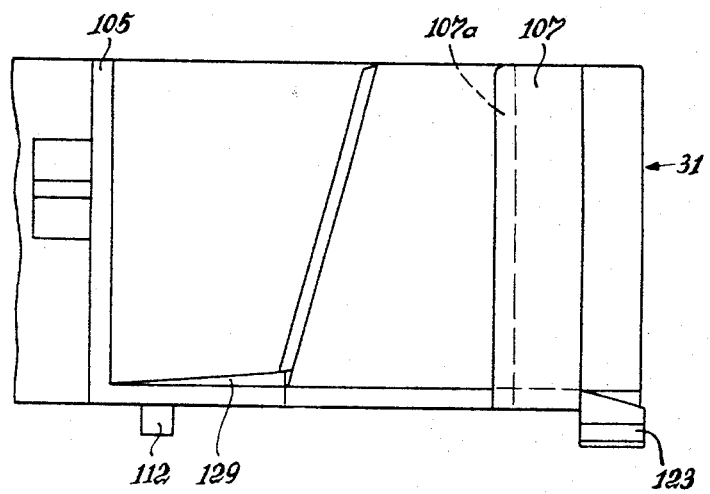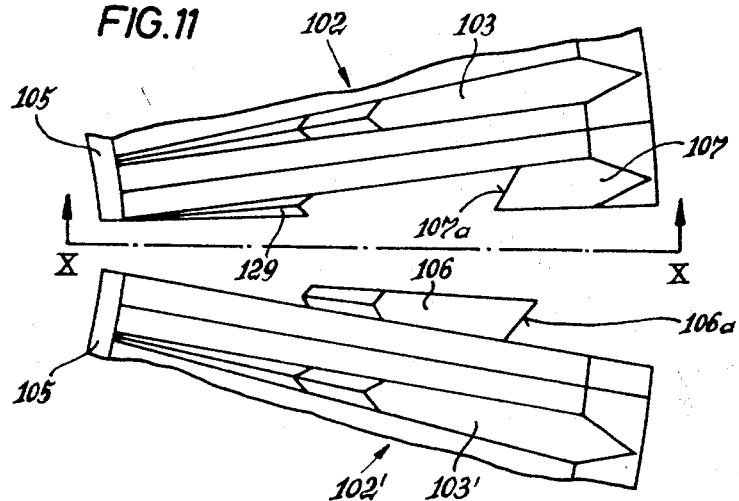

Nov. 26, 1968 E. ZILLMER 3,413,062
CIRCULAR MAGAZINE FOR PHOTOGRAPHIC PROJECTORS
Filed March 14, 1966 5 Sheets-Sheet 5
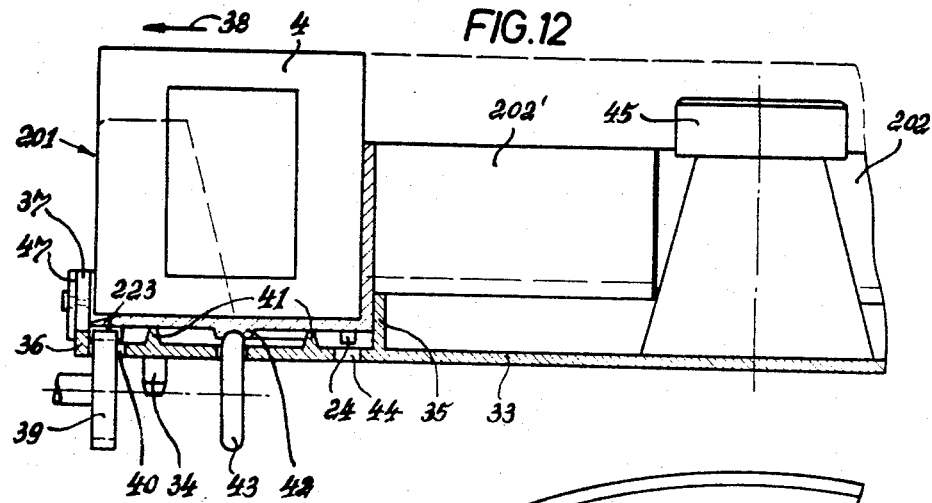
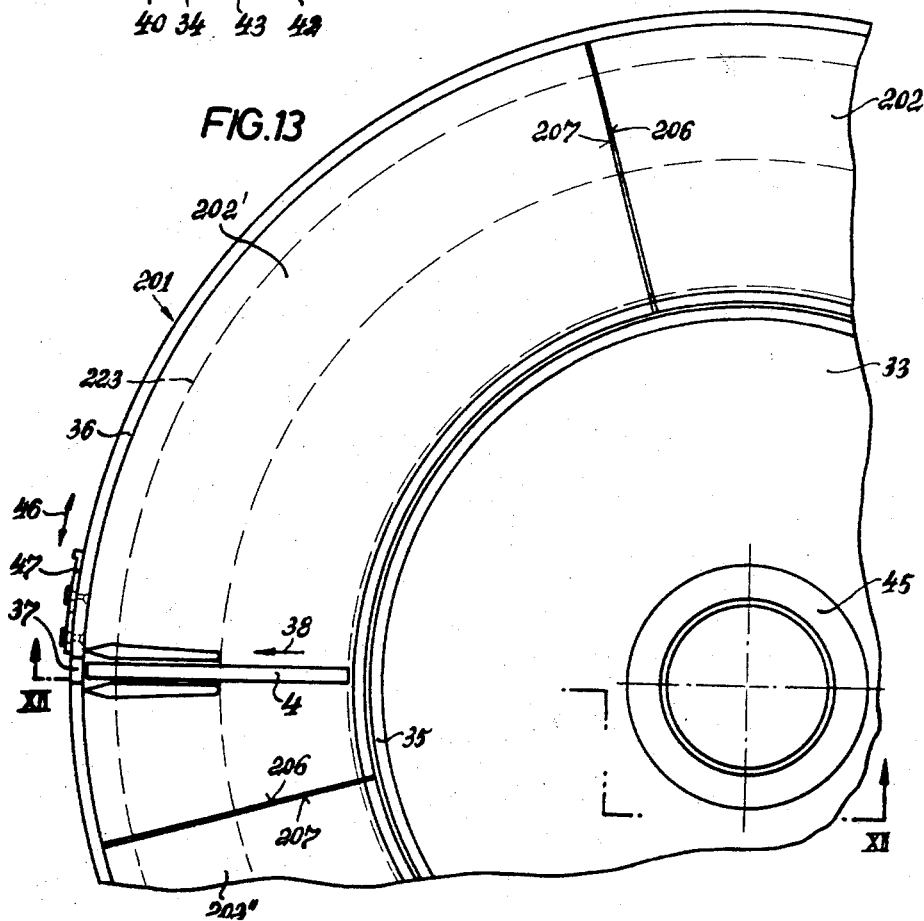

United States Patent Office
3,413,062
Patented Nov. 26, 1968

3,413,062
CIRCULAR MAGAZINE FOR PHOTOGRAPHIC
PROJECTORS
Erich Zillmer, Braunschweig, Germany, assignor to Voigtlander A.G., Braunschweig, Germany, a corporation of Germany
Filed Mar. 14, 1966, Ser. No. 533,925
Claims priority, application Germany, Mar. 16, 1965, Z 11,408
9 Claims. (Cl. 353—117)

ABSTRACT OF THE DISCLOSURE

A magazine for photographic projectors. The magazine is circular and is composed of a number of segments which respectively form parts of a circle and which are located in end-to-end relation. These segments are connected to each other and are supported for movement relative to a support plate. This support plate has a wall surrounding the segments and formed with an opening through which individual slides can be displaced to and from the magazine segments, while a closure means is provided for covering and uncovering this opening.

---

The present invention relates to photographic projectors.

In particular, the present invention relates to magazines for photographic projectors, and especially to circular magazines.

In addition to circular magazines and projectors suitable for use therewith, there are straight magazines and projectors suitable for use therewith. These different types of magazines differ from each other with respect to the number of slides they are capable of accommodating. Thus, a straight magazine is suitable for holding a maximum of approximately 50 slides, whereas a circular magazine generally has a capacity of at least 80 slides.

The operator of the projector is usually, for practical reasons, interested in loading an individual magazine with as many slides as possible, because each time a magazine is exchanged for another magazine there is an interruption in the operation of the projector with a resulting disturbance in the successive projection of a series of slides. For this reason a circular magazine with its greater capacity is preferred, although for other reasons a circular magazine has certain disadvantages. Not every series of slides is so extensive that the complete capacity of the circular magazine is fully utilized. Therefore, only partially filled circular magazines present certain disadvantages with respect to the storing of the slides, from the standpoint of space consumption and cost. If, on the other hand a circular magazine is filled by being loaded with two or more series of slides, there is the disadvantage, in the case where it is desired to project a plurality of series of slides which are arranged in two or more different circular magazines, either of the undesirable exchange of one magazine for another, or before the operation of the projector is started all of the series of slides must be loaded into a single circular magazine.

It is accordingly a primary object of the present invention to eliminate the above disadvantages of circular magazines and to provide for circular magazines advantages which heretofore have been achieved only with straight magazines.

In particular, it is an object of the invention to provide for a circular magazine a construction where there will be undesirable interruption when changing over from the projection of one series of slides to the projection of another series of slides.

Furthermore, it is an object of the invention to provide for circular magazines a construction enabling the storage advantages of straight magazines to be closely approximated.

In particular, it is an object of the invention to provide a circular magazine which can be very easily and conveniently manipulated by the operator to achieve the results of the invention.

Primarily, with the structure of the invention, the circular magazine is composed of a plurality of magazine segments arranged in end to end relation so as to form a complete circular magazine, a mechanical connecting means being provided for mechanically interconnecting the several segments.

Such a magazine segment can have dimensions which enable it to accommodate approximately the same number of slides as a conventional straight magazine. Since such straight magazines have a capacity of, at most, either 30 or 36 slides, it is possible to provide in accordance with the present invention a circular magazine composed of four magazine segments and having a minimum capacity of approximately 120 slides, so that the circular magazine of the invention is more than adequate for any single operation of the projector. In the case where a single operation of the projector requires more than the number of slides accommodated in one magazine segment, it is possible in an extremely convenient manner, with very few manipulations, to combine together a plurality of the arcuate magazine segments of the invention so as to unite them into a circular magazine which can then be operated without any interruption from one magazine segment to the next, so as to provide a more pleasant operation of the projector both from the standpoint of the operator as well as from the standpoint of the viewer.

Moreover, the formation of a circular magazine from a plurality of magazine segments, in accordance with the invention, is of particular advantage with respect to storage of the slides when they are not in use, because the magazine segments can be individually arranged, in the same way as straight magazines, either in pairs or in greater numbers in suitable containers which require a space which is greater than that required for straight magazines only to a relatively small extent. However, the space required for magazine segments of the invention is considerably smaller than that required for a conventional rigid circular magazine.

The invention is illustrated by way of example in the accompanying drawings which form part of this application and in which:

FIG. 1 is a plan view of one possible embodiment of a circular magazine according to the invention;

FIG. 2 is a plan view of an individual magazine segment;

FIG. 3 is a plan view of a support means for the magazine of the invention;

FIG. 4 is a fragmentary sectional elevation of a magazine segment of the invention, taken along line IV—IV of FIG. 5 in the direction of the arrows, and showing the structure at a scale which is enlarged as compared to that of FIGS. 1–3;

FIG. 5 is a fragmentary plan view of the structure of FIG. 4;

FIG. 6 shows the comparison between storage of magazine segments of the invention and straight magazines;

FIG. 7 is a fragmentary sectional elevation taken along lines VII—VII of FIG. 8 in the direction of the arrows and showing another embodiment of a magazine structure according to the invention;

FIG. 8 is a fragmentary plan view showing the structure of FIG. 7;

FIG. 9 is a fragmentary sectional elevation taken along lines IX—IX of FIG. 8 in the direction of the arrows;

FIG. 10 is a fragmentary elevation taken along line X—X of FIG. 11 in the direction of the arrows and showing another embodiment of a structure of a magazine according to the invention;

FIG. 11 is a fragmentary top plan view showing the adjoining ends of a pair of magazine segments of the invention;

FIG. 12 is a fragmentary transverse sectional elevation, taken along line XII—XII of FIG. 13 in the direction of the arrows, and showing another embodiment of a support means for a magazine according to the invention; and FIG. 13 is a fragmentary top plan view of the structure of FIG. 12.

FIG. 1 illustrates a circular magazine 1 constructed in accordance with the invention. This magazine 1 is composed of four identical magazine segments, 2, 2', 2", 2'''. FIG. 2 shows the magazine segment 2 by itself. Each magazine segment carries partition walls 3 which define between themselves compartments for receiving the slides 4 (FIGS. 4 and 5). Each magazine segment has a bottom wall, of arcuate configuration, carrying the partitions 3 which extend upwardly from the bottom wall, and each partition 3 extends from an outer edge of the bottom wall of the magazine segment up to a point situated approximately midway between the inner and outer peripheral edges of the bottom wall of the magazine segment. In this way, as is apparent from FIG. 5, the slides 4, which are situated in the compartments defined between the partitions, can engage each other at their inner side edges where they engage an inner wall 5 of the magazine segment, this inner wall extending upwardly from the inner peripheral edge of the bottom wall of the magazine segment. In this way there is provided, for the smallest possible diameter of the circular magazine, a maximum number of slide compartments. Moreover, it is also possible in this way to maintain for the partitions 3 the minimum thickness which is required for manufacturing the segments from plastic.

Each magazine segment is closed at its ends by a pair of end walls 6 and 7. The thickness of each end wall 6 and 7 is such that when a pair of segments are situated one next to the other in end-to-end relation, the distance from the last compartment of one segment to the first compartment of the next segment is equal to twice the distance between adjoining compartments of an individual segment. A connecting means is provided for releasably interconnecting the successive magazine segments. This connecting means includes at the exterior of each end wall 6 a projecting locking rib 8 and at the exterior of each end wall 7 a mating locking groove 9 which receives the locking rib 8. As is apparent from FIG. 5 the rib 8 and the mating groove 9 may have a matching dovetail profile. In this way the connecting means 8, 9 is capable of releasably interconnecting the successive segments in end-to-end relation, and since each segment extends through 90° of the entire circular magazine, four of the segments will form the complete magazine shown in FIG. 1.

A support means is provided for supporting the segments, and this support means also serves to hold the successive segments together in end-to-end relation. For this purpose a coupling means is provided on the segments and on the support means for releasably coupling the segments to the support means. As may be seen from FIG. 3, the support means takes the form of a circular plate 10 formed at the region of its outer periphery with openings 11. Pins 12 form projections fixed to and extending downwardly from the bottom walls of the segments, and these pins 12 are respectively received in the openings 11, so that in this way the openings 11 together with pins 12 form a coupling means for coupling the segments to the support means 10. In order to facilitate introduction of the pins 12 into the openings 11, the circular plate which forms the support means 10 is provided with centering projections 13 which slidably engage the exterior concave surfaces of the inner walls 5 of the magazine segments. For this purpose each inner wall 5 is provided with a pair of guide ribs 14 between which a projection 13 is received, so that as each segment is placed on the support means 10, the projection 13 will cooperate with ribs 14 to cam the segment to a location where the pins 12 will be precisely received without any difficulty in the openings 11. Furthermore, each magazine segment is provided at the inner exterior concave surface of its inner wall 5 with hand grips 15 for convenient handling of the magazine segment. In addition, a hand grip 16 is centrally carried by the support means 10 in order to provide a secure grip of the support means 10 together with the magazine segments 2, 2', 2", and 2''' carried thereby.

In its position of use on a photographic projector, the above-described circular magazine 1, together with its support means 10, rests on a carrier disc 17 (FIG. 4), and this disc 17 is mounted for rotary movement about the axis 18 shown in dot-dash lines in FIG. 4. This mounting of the magazine is augmented by a plurality of guide rollers 19 and 20 which are supported for rotary movement by the projector housing and which rotate about the axis 21 shown in dot-dash lines in FIG. 4. The underside of the support means 10 rests not only on the plate 17 but also on the rollers 19, while the bottom walls of the several magazine segments rest on the rollers 20. In order to advance the circular magazine 1 in a stepwise manner to bring the successive slides into position for successive projection, a magazine advancing gear 22 is turned in connection with the slide-changing operations, in a well known manner, so as to advance the magazine by an angular increment which equals the angular distance between the successive slide compartments. This advancing gear 22 meshes with a toothed strip 23 carried by the bottom wall of each magazine segment at the outer peripheral edge thereof. The toothed strip 23 is constructed in such a way that there is no interruption in the series of teeth at the adjoining ends of the successive magazine segments. This result is achieved by providing for each toothed strip a half tooth at each end of a toothed strip 23 of each magazine segment, so that when the segments are connected in end-to-end relation these half teeth join each other to form complete teeth at the junctions between the successive magazine segments.

As is particularly apparent from FIG. 5, there is at the junction between two adjoining magazine segments, as a result of the direct engagement between the end walls 6 and 7, an interruption in the otherwise uniform stepwise advancing of a magazine segment from one slide to the next. When the adjoining ends of a pair of successive magazine segments reach the operating range of the slide-changing mechanism, the slide-changing mechanism operates without changing a slide since there is no slide at this location, so that there is an interruption in the projection of the series of slides. It is possible to avoid such a disturbing interruption by advancing the gear 22 at the adjoining ends of the magazine segments through an angular increment which is twice the angular increment through which it is advanced during change-over from one slide to another slide of the same magazine segment, so that in this way the circular magazine can provide an interruption-free operation from the last compartment of one magazine segment to the first compartment of the next-following magazine segment. This double angular displacement of the magazine-advancing mechanism can be brought about with an advancing mechanism such as that shown, for example, in the older, as yet unpublished U.S. patent application Ser. No. 530,533 of the same inventor. The change-over of the advancing mechanism from the normal increment to a double increment for a single operating cycle at the adjoining ends of the magazines is brought about by actuating projections 24 (FIGS. 1, 2 and 4) fixed to and extending downwardly from the bottom walls of the several magazine segments and engaging an actuating arm of the slide-changing mechanism at the proper time to provide the double increment of advance at the adjoining ends of the several magazine segments.

FIG. 6 shows a comparison between a storage container 25 in which a pair of magazine segments 2, 2' of the present invention are situated and a storage container 26 in which a pair of conventional straight magazines 27 and 27' are situated. These magazines 27 and 27' will have the same number of slide compartments as the magazine segments 2 and 2'. It is apparent from FIG. 6 that the container 25 is not, to any substantial extent, greater than the container 26.

FIGS. 7–9 illustrate, on an enlarged scale as compared to the above figures, the construction of a partition situated between a pair of slide compartments as well as the structure of the individual slide compartments. As may be seen from FIG. 7, the partition wall 3 extends from the outer peripheral edge of the bottom wall 28 of the magazine segment, where the toothed strip 23 is located, inwardly toward the inner peripheral edge of the bottom wall 28, but terminates approximately midway between the inner and outer peripheral edges of the bottom wall 28. This partition 3 extends upwardly from the bottom wall 28 and is joined with a narrow rib 29 which also extends upwardly from the bottom wall 28 and which continues from the partition 3 inwardly toward the inner peripheral edge of the magazine segment. The upper edge of the narrow rib 29 is inclined downwardly from the partition 3 toward the bottom wall 28, as this upper edge approaches the inner peripheral edge of the bottom wall 28. In the region of the inner peripheral edge of the bottom wall 28, the rib 29 merges into this bottom wall. The upper surface of the bottom wall 28 is provided in the individual compartments which are respectively situated between the successive partitions 3 and the successive ribs 29 respectively extending therefrom, with the radially extending groove-profiles 30, respectively, which are adapted respectively to receive the bottom edges of the slides which are respectively situated in the several slide compartments. The manner in which the bottom edge of a slide 4 cooperates with such a grooved compartment bottom is indicated in dotted lines in FIG. 9 from which it is apparent that a certain holding of the slide is achieved even in that part of the compartment which is situated beyond the partitions 3 so as not to be limited thereby.

FIG. 7 illustrates the additional elements fixed to the bottom exterior surface of the bottom wall 28 and extending downwardly therefrom, namely a pin 12 of the coupling means for coupling the segment with the support means and the projection 24 which serves to actuate the slide-changing mechanism in the manner described above.

FIGS. 10 and 11 illustrate another embodiment of a connecting means for connecting together a pair of magazine segments of the invention in end-to-end relation so that the series of interconnected magazine segments can be combined to form a single circular magazine.

As is apparent from FIG. 11 the pair of magazine segments 102 and 102' illustrated therein do not have end walls which extend completely across and close the ends of the segments. Instead, one end of the magazine segment 102 is formed by a part 107 of a partition identical with the partition 103, and furthermore, at its end which is seen in FIG. 11 the magazine segment 102 has a rib 129 identical with the other ribs between the successive compartments as described above. The adjoining end of the magazine segment 102' has a partition part 106 which also has a structure identical with part of the other partitions 103 or 103' between the other compartments. The partition parts 106 and 107 will form a complete partition identical with the other partitions 103 and 103' and will be joined with the rib 129 in the same way that the remaining partitions are joined with the ribs as described above. For this purpose it is only necessary to join the segments 102 and 102' together with the edges 106a and 107a of the partition parts 106 and 107, respectively, engaging each other. Thus, as a result of this construction when the segments are joined together in end-to-end relation, with the connecting means of FIGS. 10 and 11, a partition will be formed at the adjoining ends of the segments, by the partition parts 106, 107, and the partition which is formed in this way will be identical in its size and in its construction with the other partitions 103 and 103'. It is to be noted that the end edges or faces 106a and 107a are respectively situated in planes inclined to the plane of the parts 106 and 107 at an angle other than a right angle, so that when these parts are joined together a locking of the magazine segments to each other will be provided. This locking action corresponds to that which is achieved with the locking rib 8 and locking groove 9 of the embodiments described above.

FIGS. 10 and 11 show the inner wall 105 of the magazine segments, as well as the outer toothed strips 123 which extend along the outer peripheral edge of the bottom wall of the magazine segments and which serve to advance the magazine segments in cooperation with the magazine advancing structure of the projector. Also, FIG. 10 shows a pin 112 of a coupling means which includes an opening in the support means to receive the pin 112.

The particular advantage which is achieved with the embodiment of FIGS. 10 and 11 is that, with respect to its wall thickness, it can be very advantageously made of plastic and that, above all, at the junction between the successive magazine segments there is a partition whose size corresponds to that of the other partitions. It is therefore not necessary, in order to achieve an interruption-free transition from one magazine segment to the next, to provide at the junction between the successive magazine segments an increment of displacement which is twice that of the normal increment of displacement of the magazine, since with this construction it is only required to provide, when passing from one magazine segment to the next segment, the normal increment of advance while still maintaining from the slide-changing mechanism of the projector an interruption-free transition from one magazine segment to the next.

FIGS. 12 and 13 show another embodiment of a support means for the circular magazine. In this case the successive magazine segments can have either the structure of FIGS. 1–9 or the structure of FIGS. 10 and 11. Therefore, in FIGS. 12 and 13 the magazine details which have already been described are not repeated, except insofar as these details differ from those described above.

Thus, the successive magazine segments 202, 202' and 202" are joined one to the next at their ends 206 and 207 with either of the constructions described above, and the interconnected magazine segments are placed on the plate 33 of the support means. In contrast with the support means formed by the plate 10, which includes a coupling means 11, 12 as described above, and which moves with the circular magazine, the support means 33 remains stationary in the projector housing while the circular magazine is advanced in a stepwise manner with respect to the support means 33. Thus, this support means 33 serves not only to support the magazine but also to guide the latter for movement. Fixed to the underside of the support means 33 is a positioning pin 34 which is received in an opening formed in a stationary part of the projector housing, so that in this way the position of the support means 33 in the projector housing is determined. The otherwise flat support means 33 is provided with an inner circular guiding wall 35 and an outer circular guiding wall 36 coaxially surrounding the inner wall 35 and situated at the outer periphery of the plate 33. The magazine segments are situated between the guide walls 35 and 36 to be guided thereby.

The outer wall 36 is formed with an opening 37 which will become situated in the region of operation of the slide-changing mechanism of the projector when the locating pin 34 is situated in the opening provided therefor in the magazine housing as described above. Thus, the particular slide 4 which happens to be in the region of the opening 37 can be engaged by the slide-changing mechanism and displaced in the direction of the arrow 38 (FIG. 12) out of the magazine into a projecting position and then returned back into its magazine compartment. All of the other slides are prevented from moving out the magazine by the outer wall 36. A closure means is provided for covering and uncovering the opening 37, and this closure means takes the form of a shiftable closure plate 47 carried on suitable pins which are fixed to the wall 36 with these pins extending into a suitable slot of the shiftable closure plate 47, so that the latter can be moved back and forth in the direction indicated by the double-headed arrow 46 in FIG. 13 for covering and uncovering the opening 37. Of course, when the magazine is placed on the projector, the closure plate 47 will be shifted to its open position, uncovering the opening 37, while when the structure is removed from the projector the closure plate 47 will be returned to its position covering the opening 37. This closure plate 47 is shown in its open position, uncovering the opening 37, in FIGS. 12 and 13.

The outer peripheral edges of the bottom walls of the successive magazine segments are provided with the toothed strips 223 for advancing the magazine segments in a stepwise manner, and for this purpose a magazine-advancing gear 39 extends through an opening 40 of the support means into engagement with the toothed strips 223. This advancing gear 39 forms part of a conventional advancing mechanism for advancing the magazine in a stepwise manner to situate the successive slides in position to be successively projected, respectively. In order to reduce as much as possible the frictional engagement between the magazine segments and the support means 33, this support means is provided with arcuate slide ribs 41 fixed to and projecting upwardly from the top face of the plate 33 and slidably engaging the lower surfaces of the bottom walls of the magazine segments. Furthermore, the lower exterior surfaces of the bottom walls of the magazine segments are respectively provided with guide grooves 42 which are coaxial with the circular magazine and which receive a plurality of guide rollers 43 which are distributed along the periphery of the support means 33 and supported for rotary movement by the projector housing. The plate 33 is formed with suitable openings through which the guide rollers 43 freely extend into the guide grooves 42.

The plate 33 is formed with a further opening 44 serving to provide a passage for an element which will cooperate with the successive projections 24 and the slide-changing mechanism of the projector in order to provide a double increment of advance at the region where one end of the magazine segment adjoins the end of the next magazine segment, in the case where the magazine segments have the structure of FIGS. 1-9.

For the convenience of the operator the support means 33 fixedly carries at its central portion a handle 45.

What is claimed is:

1. For use in a photographic projector, a circular magazine comprising a plurality of magazine segments respectively forming parts of a circle and situated in end-to-end relation one next to the other, connecting means releasably connecting said segments to each other, support means supporting said segments and guiding said segments for movement relative to said support means, said support means including an outer wall surrounding said segments and formed with an opening through which individual slides can pass out of and back into said magazine segments, and closure means cooperating with said outer wall for covering and uncovering said opening thereof.

2. For use in a photographic projector, a circular magazine comprising a plurality of magazine segments respectively forming parts of a circle and situated in end-to-end relation one next to the other, connecting means releasably connecting said segments to each other, support means supporting said segments and guiding said segments for movement relative to said support means, said support means including a plate situated beneath said segments and formed with openings through which individual slides can pass out of and back into said magazine segments.

3. For use in a photographic projector, an arcuate magazine segment adapted to be joined in end-to-end relation with additional arcuate magazine segments to form at least part of a circular magazine, said arcuate magazine segment having a bottom arcuate wall provided with inner and outer peripheral edges and carrying a plurality of partitions extending upwardly from said bottom wall and defining between themselves compartments for slides, said partitions each extending from said outer peripheral edge inwardly toward said inner peripheral edge and terminating substantially midway between said edges, said magazine segment including a plurality of ribs extending upwardly from said bottom wall respectively from said partitions toward said inner edge, said ribs respectively having upper edges inclined from said partitions respectively downwardly towards said bottom wall and respectively merging into said bottom wall in the region of said inner edge.

4. The combination of claim 3 and wherein a connecting means is connected with said segment for connecting the latter to additional segments.

5. The combination of claim 4 and wherein said segment has a pair of end walls adapted to be situated adjacent end walls, respectively, of adjoining segments, said end walls having a thickness which together with the end walls of adjoining segments provides from the last slide compartment of one segment to the first slide compartment of the next segment a distance which is twice as great as the distance between the slide compartments of an individual magazine segment.

6. The combination of claim 5 and wherein said connecting means is carried by said end walls at the exterior thereof and includes at a pair of adjoining end walls a locking rib projecting from one of the adjoining end walls and a locking groove formed in the other of the adjoining end walls and receiving said locking rib.

7. The combination of claim 4 and wherein said connecting means includes one part of a partition forming an end wall of said segment and another part of a partition forming an adjoining end wall of an adjoining segment, and said partition parts when joined together forming a complete partition providing between the last compartment of one segment and the first compartment of the next segment a distance equal to the distance between the compartments of a single segment.

8. The combination of claim 7 and wherein said partition parts have adjoining edges respectively situated in planes which are inclined with respect to the plane of the partition formed by said parts at an angle other than a right angle.

9. For use in a photographic projector, an arcuate magazine segment adapted to be joined in end-to-end relation with additional arcuate segments to form at least part of a circular magazine, said arcuate magazine segment having a bottom arcuate wall provided with inner and outer peripheral edges and carrying a plurality of partitions extending upwardly from said bottom wall and defining between themselves compartments for slides, said partitions each extending from said outer peripheral edge inwardly toward said inner peripheral edge and terminating substantially midway between said edges, said bottom wall having a downwardly directed surface formed with a guide groove for receiving a guide roller of the projector.

(References on following page)

References Cited

UNITED STATES PATENTS

| | | | |
|---|---|---|---|
| 986,395 | 3/1911 | King | 220—23.4 |
| 1,504,657 | 8/1924 | Trueblood | 88—27 |
| 1,594,952 | 8/1926 | Headding et al. | 88—27 |
| 2,748,653 | 5/1956 | Pollan et al. | 88—27 |
| 2,974,821 | 3/1961 | Lamont | 220—23.4 |
| 3,065,874 | 11/1962 | Maiershofer | 88—28 |
| 3,343,454 | 9/1967 | Mahoney | 88—27 |

FOREIGN PATENTS 1,061,808  12/1953  France.

NORTON ANSHER, *Primary Examiner.*

RICHARD M. SHEER, *Assistant Examiner.*